T. FOWLER.
Grain Binder.
No. 103,862.
Patented June 7, 1870.
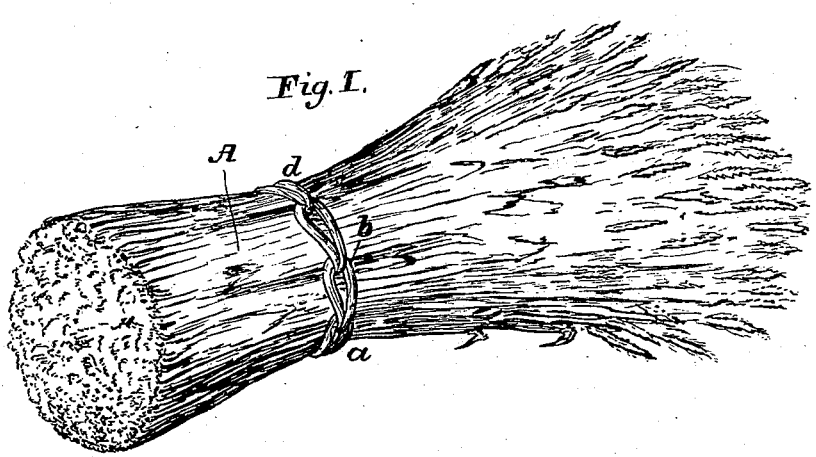
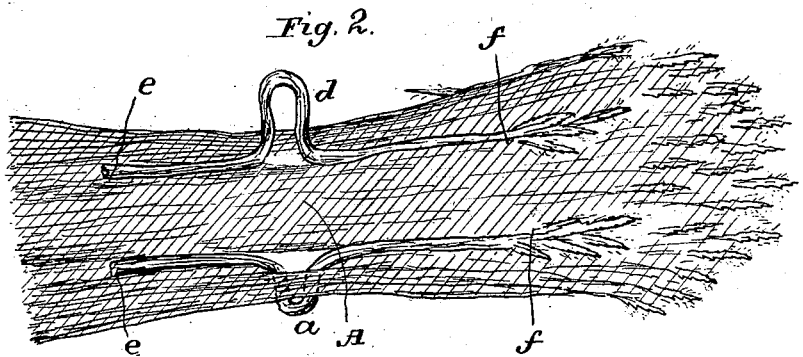
Witnesses:
Chas. C. Wilson
Edmund Masson.
Inventor:
Thaddeus Fowler.
By atty. A. B. Stoughton.

UNITED STATES PATENT OFFICE.

THADDEUS FOWLER, OF TOTTENSVILLE, NEW YORK.

IMPROVED METHOD OF BINDING GRAIN.

Specification forming part of Letters Patent No. 103,862, dated June 7, 1870.

*To all whom it may concern:*

Be it known that I, THADDEUS FOWLER, of Tottensville, in the county of Richmond and State of New York, have invented certain new and useful improvements in the manner of binding and holding in bundles, grain, straw, grass, or other stalks; and that the following is a full, clear, and exact description of the same, reference being had to the accompanying drawings, making a part of this specification, in which—

Figure 1 represents in perspective a bundle of grain bound by my plan or process; and Fig. 2 represents a sectional drawing of a bunble of grain, to show where the straw, or stalks by or with which it is bound, is drawn from.

My invention consists in binding bales or bundles by drawing from such bale or bundle a series of loops which bind or interlock one with the other, while the ends of the tufts from which these loops are made remain and are held in the bundle so bound, and so hold the loops or binding.

To enable others skilled in the art to make and use my invention, I will proceed to describe the same, with reference to the drawings.

A represents a bundle of grain bound in the manner which I have discovered and herein claim, which is done substantially as follows: The gavel or bundle to be bound is held in any suitable manner, and from its interior, and at or near the middle in length of said bundle, is drawn out a looped tuft, as at $a$. The bundle is then turned a short distance, and a second loop, $b$, is drawn out and passed through the one $a$. It is again slightly turned, and another loop, $c$, is drawn through the one $b$, and so on by a series of loops one passing through or interlocked by another, until the series of loops extend clear around the bundle, or beyond where the looping commenced far enough to fasten the bundle by the extended loops, or the last made loop may be tucked into or under the previous one, or jammed into the bundle to produce friction enough to prevent the loops from running out or becoming undone. The ends $e\ f$, respectively, of the tufts which are so drawn out to form the loops remain in the bundle, and are held there by friction sufficient to resist the heaviest and roughest handling of the bundles or bales. The interlacing of the tufts or loops so drawn from the material that is being bound avoids all necessity of providing bands of any kind.

Having thus fully described my invention and shown how it is practiced, what I claim is—

The method of binding a bale or bundle of grain, straw, grass, stalks, or other fibrous material by drawing out loops of the material to be bound from the interior of the bundle, and interlocking said loops one with the other, until a band is formed around the bundle, substantially as described.

THADDEUS FOWLER.

Witnesses:
   A. B. STOUGHTON,
   EDMUND MASSON.